United States Patent
Yoon et al.

(10) Patent No.: US 10,815,126 B2
(45) Date of Patent: Oct. 27, 2020

(54) CARBON NANOTUBE STRUCTURE AND METHOD FOR MANUFACTURING SAME

(71) Applicant: LG CHEM, LTD., Seoul (KR)

(72) Inventors: Jae Keun Yoon, Daejeon (KR); Sung Jin Kim, Daejeon (KR); Dong Hyun Cho, Daejeon (KR)

(73) Assignee: LG CHEM, LTD., Seoul (KR)

( * ) Notice: Subject to any disclaimer, the term of this patent is extended or adjusted under 35 U.S.C. 154(b) by 175 days.

(21) Appl. No.: 16/068,015

(22) PCT Filed: May 29, 2017

(86) PCT No.: PCT/KR2017/005596
§ 371 (c)(1),
(2) Date: Jul. 3, 2018

(87) PCT Pub. No.: WO2017/213372
PCT Pub. Date: Dec. 14, 2017

(65) Prior Publication Data
US 2019/0002289 A1    Jan. 3, 2019

(30) Foreign Application Priority Data

Jun. 10, 2016    (KR) .................. 10-2016-0072245

(51) Int. Cl.
*C01B 32/174*    (2017.01)
*C01B 32/158*    (2017.01)
(Continued)

(52) U.S. Cl.
CPC .......... *C01B 32/174* (2017.08); *C01B 32/158* (2017.08); *C01B 32/168* (2017.08);
(Continued)

(58) Field of Classification Search
CPC ... C01B 32/158; C01B 32/168; C01B 32/174; D01F 9/08; C01P 2006/11; B01J 2/06; B82Y 30/00; B82Y 40/40
See application file for complete search history.

(56) References Cited

U.S. PATENT DOCUMENTS

2010/0254888 A1    10/2010    Kawakami et al.
2011/0124790 A1    5/2011    Penicaud

FOREIGN PATENT DOCUMENTS

CN    102218143 B    8/2012
JP    2003-054921 A    2/2003
(Continued)

OTHER PUBLICATIONS

Miao, Menghe. "Electrical conductivity of pure carbon nanotube yarns." Carbon 49.12 (2011): 3755-3761.*
(Continued)

*Primary Examiner* — Richard M Rump
(74) *Attorney, Agent, or Firm* — Dentons US LLP

(57) ABSTRACT

According to the present invention, a carbon nanotube structure can be manufactured by merely a simple process in which carbon nanotubes are pulverized and mixed in a dispersion solvent without a dispersant, followed by freezing, and then the dispersion solvent is removed. Such a method does not require a dispersant and a binder so that the manufactured carbon nanotube structure can be composed of only carbon nanotubes, and does not depend on the other additives to form the carbon nanotube structure so that there is little possibility of damage and contamination of the structure during the collection procedure of the structure after the formation of the structure.

8 Claims, 2 Drawing Sheets

(51) Int. Cl.
    *C01B 32/168*     (2017.01)
    *D01F 9/08*     (2006.01)
    *B82Y 30/00*     (2011.01)
    *B82Y 40/00*     (2011.01)
    *B01J 2/06*     (2006.01)

(52) U.S. Cl.
    CPC . *D01F 9/08* (2013.01); *B01J 2/06* (2013.01); *B82Y 30/00* (2013.01); *B82Y 40/00* (2013.01); *C01P 2006/11* (2013.01)

(56) References Cited

FOREIGN PATENT DOCUMENTS

| | | |
|---|---|---|
| JP | 2006-248875 A | 9/2006 |
| JP | 2011-190128 A | 9/2011 |
| JP | 2015-101531 A | 6/2015 |
| JP | 2015-221748 A | 12/2015 |
| KR | 10-1400406 B1 | 5/2014 |
| WO | 2011/111499 A1 | 9/2011 |

OTHER PUBLICATIONS

English machine translation of WO2011111499A.*
Ivall, Jason, et al. "Behavior of surface-functionalized multiwall carbon nanotube nanofluids during phase change from liquid water to solid ice." Crystal Growth & Design 15.8 (2015): 3969-3982.*
English machine translation of JP2015101531.*
Ma, et al.: "Spiers Memorial Lecture: Advances of carbon nanomaterials", XP055517421, Royal Society of Chemistry, Faraday Discussions, vol. 173, No. 9, Jan. 1, 2014, pp. 9-46.

* cited by examiner

[Fig. 1]
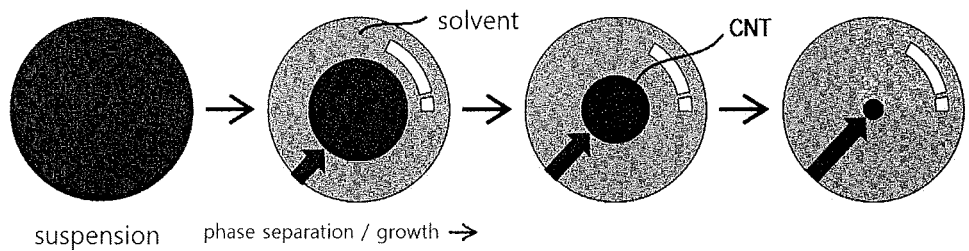
suspension    phase separation / growth →
[Fig. 2]
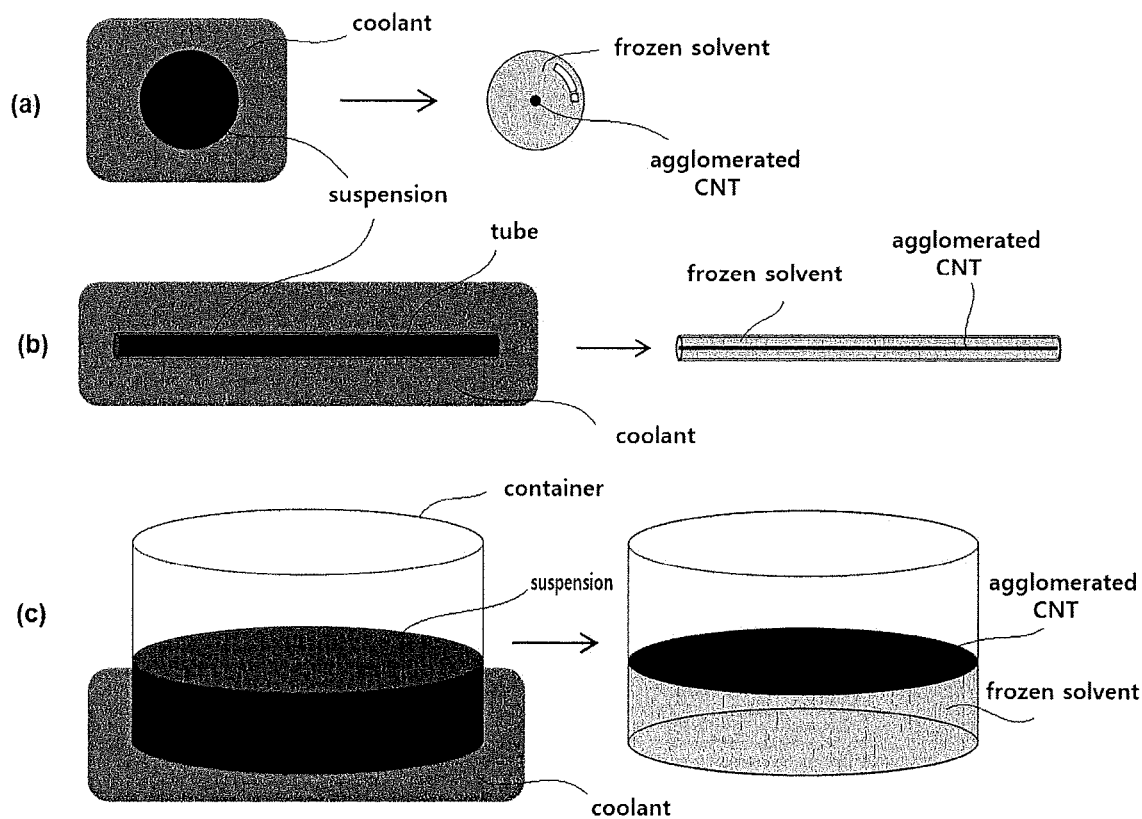

[Fig. 3]
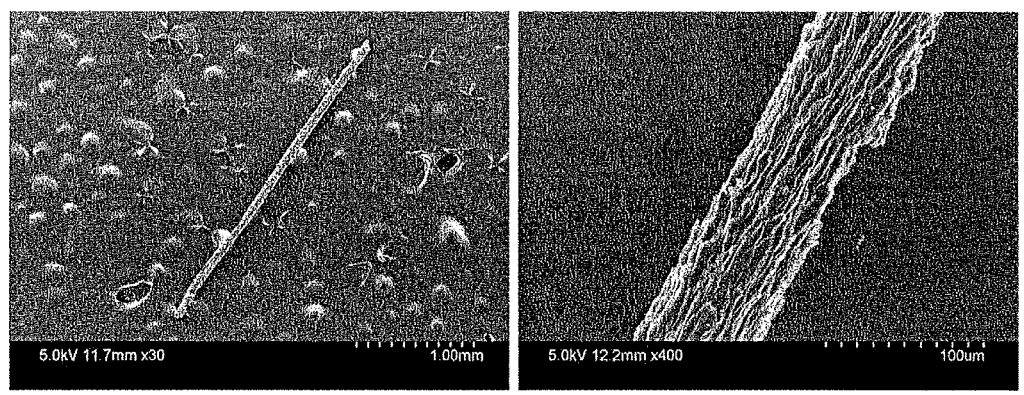

CARBON NANOTUBE STRUCTURE AND METHOD FOR MANUFACTURING SAME

BACKGROUND OF THE INVENTION

1. Field of the Invention

This application is a National Stage Application of International Application No. PCT/KR2017/005596, filed on May 29, 2017, which claims priority to and the benefit of priority to Korean Patent Application No. 10-2016-0072245, filed on Jun. 10, 2016, all of which are hereby incorporated by reference in their entirety for all purposes as if fully set forth herein.

The present invention relates to a carbon nanotube structure and a method for manufacturing same, and more particularly, to a carbon nanotube structure containing only carbon nanotubes as a constituent component and a method for producing the same.

2. Description of the Related Art

The carbon nanotubes exhibit an insulator, a conductor or a semiconductor property depending on the chirality of the tube itself. Carbon nanotubes have strong tensile strength more than 100 times greater than steel due to their strong covalent bond with carbon atoms, excellent flexibility and elasticity, and chemically stable characteristics. Due to such size and specific physical properties, they are industrially important in the production of composites and has high utility in the fields of electronic materials, energy materials and various other fields. For example, the carbon nanotubes may be applied to an electrode of an electrochemical storage device such as a secondary cell, a fuel cell, or a super capacitor, an electromagnetic wave shield, a field emission display, or a gas sensor.

Conventionally known method for processing carbon nanotubes using freeze-drying includes freezing a carbon nanotube solution in which a dispersant, a surface modifying agent, a binder, and the like are added and dispersed, and then sublimating the dispersion solvent at a low pressure to leave only a carbon nanotube structure. The method has been effectively used to make carbon nanotube structures having a large surface area, mainly having cavities therein. In case of using such a freeze-drying method, with only carbon nanotubes, dispersibility and cohesive force of the carbon nanotubes may be deteriorated. For this reason, in order to maintain the shape of the structure during sublimation and to disperse the carbon nanotubes well in the solution, a method of adding a surface modifying agent, a binder, and the like has been used.

An object of the invention is to produce a specific type of carbon nanotube structure having appropriate cohesive force without using a dispersant, a binder and the like.

Another object of the invention is to provide a carbon nanotube structure which is produced by the above method and does not contain a dispersant or a binder and thus has a high content of carbon nanotubes.

In order to solve the problems of the present invention, there is provided a carbon nanotube structure containing only carbon nanotubes as a constituent component.

In addition, the present invention provides a method comprising the steps of:

preparing a carbon nanotube suspension by pulverizing and mixing carbon nanotubes in a dispersion solvent;

freezing the carbon nanotube suspension by rapid cooling using a coolant; and removing the dispersion solvent from the frozen suspension.

Effects of the Invention

According to the present invention, it is possible to provide a carbon nanotube structure having appropriate cohesive force only by a simple process of pulverizing and mixing carbon nanotubes in a dispersion solvent, freezing them with a coolant, and drying the frozen dispersion solvent. The carbon nanotube structure manufactured by this method does not require a dispersant, a binder, and the like, and thus it can be composed of only carbon nanotubes. Since the removal process of the dispersant or the binder is not required, there is less possibility of damage and contamination in the recovery process after the formation of the structure.

BRIEF DESCRIPTION OF THE DRAWINGS

FIG. 1 shows a principle of forming a carbon nanotube structure using freezing compression of the present invention.

FIG. 2 shows a principle of forming a carbon nanotube structure according to one embodiment. FIG. 2(a) is a spherical shape (zero-dimensional), FIG. 2(b) is a linear shape (one-dimensional), and FIG. 2(c) is a disk shape (two-dimensional).

FIG. 3 is a SEM image of a fiber-shaped carbon nanotube structure fabricated by freezing and compressing in a capillary according to one embodiment.

DETAILED DESCRIPTION OF THE INVENTION

The terms and words used in the present specification and claims should not be construed as limited to ordinary or dictionary meanings and should be construed in accordance with the technical idea of the present invention based on the principle that the inventor can appropriately define the concept of the term in order to explain his invention in the best way.

Hereinafter, the present invention will be described in detail.

The carbon nanotube structure according to the present invention is a carbon nanotube structure in which the content of carbon nanotubes is 100 wt % of the total mass of the structure, that is, a carbon nanotube structure in which additives and impurities other than carbon nanotubes are not contained.

The present invention can produce a structure comprising only carbon nanotubes by pulverizing and mixing carbon nanotubes in a dispersion solvent without containing a dispersant and a binder, freezing them with a coolant, and drying the frozen dispersion solvent.

Freezing of the suspension in which the carbon nanotubes are dispersed in the dispersion solvent occurs from the portion in contact with the coolant. The frozen dispersion solvent forms crystals. The crystals gradually grow while pushing out the carbon nanotubes having a low affinity for the dispersion solvent. As a result, the suspension is frozen in such a manner that the carbon nanotubes are agglomerated in a direction not contacting the coolant due to crystal growth of the dispersion solvent.

The temperature of the coolant influences the freezing and growth rate of the crystals, which determines the degree of separation between the solvent and the carbon nanotubes and influences the bulk density of the finally formed carbon nanotube structure.

Thereafter, the solvent is removed from the frozen suspension to form a carbon nanotube structure having a specific form without a dispersant and a binder.

That is, according to the present invention, the carbon nanotube structure can be manufactured by the method comprising the steps of:

preparing a carbon nanotube suspension by pulverizing and mixing carbon nanotubes in a dispersion solvent;

freezing the carbon nanotube suspension by rapid cooling using a coolant; and removing the dispersion solvent from the frozen suspension.

The carbon nanotube structure manufactured by the method according to the present invention has a specific form that can be produced by a simple process, and it is a structure containing only carbon nanotubes as a constituent component.

As the hydrophilic solvent that can be used in the present invention, a solvent having a low affinity for the carbon nanotubes can be selected. That is, by using a substance having a repulsive force with respect to the carbon nanotubes as a dispersion solvent, the phase separation between the solvent and the carbon nanotubes in the freezing process can be more efficiently occurred by the repulsive force with the nanomaterials.

Examples of the hydrophilic solvent may be, in addition to water, a hydrophilic solvent selected from alcohols such as methanol, ethanol, isopropanol, tert-butanol, tert-amyl alcohol, methyl glycol, butoxyethanol, methoxypropanol, methoxypropoxypropanol, ethylene glycol, water-soluble oligomer of ethylene glycol, propylene glycol, water-soluble oligomer of propylene glycol, and glycerol; ethers such as ethylene glycol monomethyl ether, ethylene glycol dimethyl ether, propylene glycol monomethyl ether, propylene glycol dimethyl ether and glycerol ether; and ketones such as acetone, methyl ethyl ketone and dioxane. Preferably, a hydrophilic solvent having a freezing point of −40° C. or higher, or −20° C. or higher, more preferably from −10° C. to 10° C. may be used. For example, any one selected from water (m.p. 0° C.) and ethylene glycol (m.p. −13° C.) and the like can be used. Water (distilled water) can be used as the most suitable dispersion solvent in terms of mass production and economy of the process.

The dispersion solvent according to the present invention undergoes a freezing process. Therefore, if the freezing point of the solvent is too low, the ease and economy of the process may be reduced. Moreover, in the case of drying using the freeze-drying method the sublimated solvent is frozen and held in a trap portion which serves to hold the sublimated solvent out of the pump. In this case, if the freezing point of the solvent is too low, the difficulty in a process may be caused.

In addition, it may be desirable to avoid corrosive solvents, as damage to the equipment may be caused by the subliming solvent during removing the solvent.

The method for producing a carbon nanotube structure according to the present invention uses phase separation of a hydrophilic solvent and carbon nanotubes generated in the process of rapidly cooling of the suspension in which carbon nanotubes are pulverized and mixed in a hydrophilic solvent. More specifically, in the process of rapid cooling of the suspension, freezing occurs from the portion where the suspension contacts with the coolant, the frozen hydrophilic solvent forms crystals, and the crystals gradually grow while pushing out the carbon nanotubes contained in the suspension. At this time, the carbon nanotubes contained in the suspension are pushed in a direction in which crystallization is occurred relatively late, i.e., toward the center of the suspension or opposite to the interface with the coolant. An agglomerated structure is formed depending on the initial form of the suspension. For example, in case that the carbon nanotube suspension initially has a spherical shape as shown in FIG. 1, the finally cooled and frozen suspension may have a spherically dense carbon nanotube structure surrounded by spherical ice at the center.

The shape of the compressed carbon nanotube structure according to the present invention can be determined depending on the initial shape of the suspension, and it is possible to obtain a carbon nanotube structure having a specific shape by removing the frozen solvent from the solidified suspension.

According to one embodiment of the present invention, the carbon nanotube structure may be a zero-dimensional structure having a spherical shape such as a bead shape, a one-dimensional structure having a long and thin straight shape such as a rod shape or a fiber shape, or a two-dimensional structure having a flat top and a coin-like shape such as a pellet shape, a cylinder shape, or a plate shape.

The fiber shape means that the carbon nanotubes are agglomerated in the form of a long and thin straight shape.

According to one embodiment, in case that spherical droplets of suspension are formed as shown in FIG. 2(a) to finally form a spherical carbon nanotube structure, solid beads of suspension are formed by forming droplets of suspension and cooling them rapidly.

For example, the carbon nanotube structure may be produced by a method comprising the steps of spraying the suspension in droplets; rapidly freezing the sprayed droplets with a coolant to prepare frozen solid beads of suspension; and drying the frozen suspension to remove the frozen hydrophilic solvent.

For example, the suspension may be dropped in droplets into a freezer cooled with a coolant through a nozzle to form solid beads of suspension, wherein the nozzle is tapered or has a plurality of diameters to form suspension droplets having a uniform shape and size. At this time, since the size of the carbon nanotube structure is determined according to the size of the suspension beads, it is important to form beads of a certain size.

Herein, the term "droplet" refers to a state in which the suspension forms a sphere in a liquid state and the term "beads" refers to a state in which the suspension is frozen to form a sphere in a solid state.

The entire surface of the dropped suspension droplets may be directly exposed to the coolant.

According to another embodiment, it is provided a carbon nanotube structure in the form of a long and thin shape such as a fiber shape or a rod shape, which is produced by the method comprising the steps of:

injecting the carbon nanotube suspension into a capillary;

rapidly cooling the carbon nanotube suspension injected into the capillary to freeze it; and drying the frozen suspension to remove the frozen hydrophilic solvent.

That is, by using the method of cooling the suspension as it is in a capillary-shaped hollow nozzle and drying it, it is possible to form a long and thin carbon nanotube structure such as a fiber shape or a long rod shape.

For example, as shown in FIG. 2(b), it can be performed using a capillary tip for injecting a raw material in one nozzle. By controlling the diameter of the inlet of the capillary, the feed rate of the raw material, and/or the inner diameter of the capillary, the ratio of the injected suspension can be adjusted.

At this time, each shape may be dependent on the shape of the capillary nozzle, and the carbon nanotube suspension may be frozen and lyophilized within the nozzle having the capillary to produce the carbon nanotube structure.

The entire outer surface of the capillary may be in direct contact with the coolant.

According to another embodiment, the suspension may be frozen in a container or a mold as in FIG. 2(c).

According to this method, it comprises the steps of:
placing the suspension in a container or a mold; and
bringing the bottom of the container or mold into contact with a coolant to freeze the suspension,
wherein the part directly contacting with the coolant is the lower part of the suspension, so that the crystals of the hydrophilic solvent grow from the lower part to the upper part of the suspension, the carbon nanotubes become dense at the top of the container, and finally a two-dimensional carbon nanotube structure of a disk shape or a pellet shape is formed.

At this time, the coolant may be located at the lower part of the container, and the upper part may not be in direct contact with the coolant.

According to one embodiment, the carbon nanotube powders may be used in an amount of 0.1 to 20 wt % of the total weight of the suspension. If the content is less than 0.1 wt %, the concentration of the suspension is too low and thus an excessive amount of hydrophilic solvent is required, which may be inefficient in the production process. If the content exceeds 20 wt %, the content of the carbon nanotubes increases in the solid suspension compared to the hydrophilic solvent, so that phase separation may be difficult. The concentration of the carbon nanotube in the suspension may be 0.1 to 10 wt %, or 0.1 to 5 wt %, or 0.1 to 1 wt %.

That is, the volume ratio of the carbon nanotubes becomes large, so that the space in which the crystals can push out the carbon nanotubes by the phase separation decreases, and thus the compression ratio or the cohesive force can be reduced. Reductions in compressibility and cohesive force can affect the strength of the structure.

Examples of the method for removing the hydrophilic solvent from the frozen suspension include a method in which the frozen suspension is put in an oven and heated, or a method in which the freeze-drying is performed.

The freeze-drying is a drying method comprising a sublimation process in which ice is directly changed into vapor by freezing and then lowering the partial pressure. Here, lowering the partial pressure means lowering the pressure to below the triple point of the solution. For example, if the hydrophilic solvent is water ($H_2O$), it means lowering the pressure below the triple point of water, i.e., 6 mbar or 4.6 Torr. At this time, the water having the form of ice under low pressure is sublimated directly into vapor instead of being converted into liquid by supplying thermal energy.

The bulk density of the carbon nanotube structure according to the present invention may be 20 to 1500 kg/m³. Depending on the use of the carbon nanotube structure, the bulk density can be variously adjusted within the above range.

The bulk density of the carbon nanotube structure manufactured according to the present invention may be defined by the following Equation (1):

$$\text{Bulk density of CNT structure (kg/m}^3\text{)} = (M_s \times C_{cnt})/V_{cnt} = [(V_s \times \rho_s) \times C_{cnt}]/V_{cnt} \quad \text{[Equation 1]}$$

wherein,
$M_s$ is the total weight of the frozen suspension,
$C_{cnt}$ is the weight fraction of the carbon nanotubes contained in the suspension,
$V_{cnt}$ is the volume of the manufactured carbon nanotube structure,
$V_s$ is the total volume of the frozen suspension, and
$\rho_s$ is the density of the frozen suspension.

The total volume of the frozen suspension means, for example, the volume of the frozen suspension in a specific shape. For example, if the shape of the frozen suspension has a spherical shape, the volume of the sphere can be determined and applied. If the frozen suspension is frozen in the capillary, the volume inside the capillary can be determined and applied.

According to one embodiment, the diameter or length of the carbon nanotube structure according to the manufacturing method of the present invention is less than the diameter or length of the original suspension, i.e., the diameter or length of the frozen suspension. For example, the decreasing rate of the diameter or length of the carbon nanotube structure with respect to the diameter or length of the suspension frozen in specific shape may be 20% or more, and the decreasing rate may be defined by the following Equation (2).

$$\text{Decreasing rate of the diameter or length (\%)} = \{1 - [(\text{Diameter or length of the CNT structure})/(\text{Diameter or length of the frozen suspension})]\} \times 100 \quad \text{[Equation 2]}$$

Here, the decreased diameter or length means a decreased diameter or length in the compression direction. For example, if the original shape is spherical, the compression direction may be all the way towards the center of the sphere, and if frozen in the capillary, it can be reduced in the direction of the central axis of the capillary.

According to one embodiment, the capillary used in the present invention may have an inner diameter of 500 μm to 1000 μm and a length of 50 mm to 100 mm. The diameter of the carbon nanotube structure manufactured from the suspension frozen in the capillary may be reduced to ⅕ or less, 1/10 or 1/15 or less of the inner diameter of the capillary. For example, it is possible to obtain a compressed carbon nanotube structure having a diameter of 100 μm to 200 μm or 50 μm to 100 μm or 30 μm to 70 μm.

The freezing coolant for cooling refers to a coolant which is maintained at a low temperature so that the suspension can be formed in the form of a solid, that is, can be rapidly cooled. The temperature of the freezing coolant may be, for example, 0° C. or less, or 0° C. to −200° C., or −10° C. to −200° C.

In the present invention, the freezing rate affects the physical properties of the finally obtained compressed structure. The slower the freezing rate is, the higher the bulk density of the compressed structure is, and the higher the strength is, because the phase separation is reliably occurred. However, it takes more time to freeze, and the throughput decreases.

A cryogenic coolant such as liquefied gases used in conventional cryogenic process or liquid-oil cooled at low temperature may be mentioned as the freezing coolant. Conventional cryogenic coolant that can be used as the freezing coolant in the present invention includes materials that can be liquefied at a temperature of 0° C. or less and which themselves maintain a temperature of 0° C. or less, such as liquid nitrogen, liquid oxygen or liquid air, and in some cases liquefied hydrocarbons may be used. Preferably, liquid nitrogen may be used alone or in combination with other coolants.

In the present invention, as the freezing coolant, an oil being in a liquid phase and having fluidity even at a low temperature of 0° C. or lower, for example, silicone oil and mineral oil can be used. Silicone oil and mineral oil can be preferably used because they have not much change in viscosity with temperature change so that they can maintain sufficient fluidity even at the aforementioned freezing temperature. Examples of the silicone oil include dimethyl silicone oil, methylphenyl silicone oil, methylhydrogen silicone oil, methylhydroxy silicone oil, fluoro silicone oil, polyoxyether copolymer, alkyl-modified silicone oil, higher fatty acid-modified silicone oil, amino-modified silicone oil, and epoxy-modified silicone oil. Mineral oil, also called liquid petroleum, refers to a byproduct produced during the refining of crude oil into petroleum, of which main constituents are alkane and paraffin.

Oils that are in a liquid phase at low temperature below 0° C., such as silicone oils and mineral oils as described above, can be cooled to a desired low temperature using a cooler, liquefied gas, or other cooling medium (e.g., mixture of dry ice and acetone, mixture of ice and ethanol) to use as a cryogenic coolant. Liquefied gases such as liquid nitrogen, liquid oxygen, or liquid air, as described above, can be used as a cryogenic coolant by itself. In some cases, liquefied hydrocarbons may also be used as low temperature coolant.

According to one embodiment, a purification process may be further included to separate particles of the suspension frozen with the coolant after the cooling process.

The present invention also provides a method of manufacturing a CNT composite material using the compressed carbon nanotube structure.

According to the present invention, not using carbon nanotubes, but using a compressed carbon nanotube structure in a spherical shape, a rod shape or a fiber shape by a freezing compression in the production of a composite material, it is possible to respond to a demand for a structure that has a specific shape without substances other than nanotubes.

In addition, it is possible to solve problems of changes in content generated by scattering of powder and the safety problems. It can be more easily transferred, transported and improved because of higher density than the powder form. Therefore, it can be more effectively applied to production of composite materials.

For example, the composite material can be applied to, for example, an electrode of an electrochemical storage device such as a secondary battery, a fuel cell or a super capacitor, an electromagnetic wave shield, a field emission display, or a gas sensor.

The present invention will be explained in more detail with reference to the following examples, including comparative examples. However, these examples are provided for illustrative purposes only and are not intended to limit the scope of the invention.

Example 1: Production of a Fiber-Shaped Carbon Nanotube Structure 0.3 wt % of carbon nanotubes were added to distilled water and then pulverized to prepare a carbon nanotube suspension. The suspension was injected into a capillary having the conditions shown in Table 1 below and then was frozen to obtain a suspension frozen in a fiber shape. At this time, the total weight of the suspension injected into the capillary is about 37.7 mg, and the weight of the carbon nanotubes contained therein can be calculated as 0.113 mg. The frozen suspension was dried in an oven to obtain a carbon nanotube structure. The average diameter, length, volume, and weight of the resulting carbon nanotube structure are shown in Table 1 below. The bulk density of the obtained carbon nanotube structure is about 769 kg/m$^3$.

TABLE 1

| | Inner diameter of capillary | CNT structure | Ratio | Decreasing rate |
|---|---|---|---|---|
| Diameter (r) | 800 μm | 50 μm | 1/16 | 93.8% |
| Length (l) | 75 mm | 75 mm | — | — |
| Volume ($\pi r^2 \times l$) | 3.77 × 10$^{-8}$ m$^3$ | 1.47 × 10$^{-10}$ m$^3$ | 1/256 | 99.6% |

While specific embodiments of the invention have been described in detail, it will be appreciated by those skilled in the art that such detailed descriptions are merely preferred embodiments and the scope of the present invention is not limited thereto. Therefore, the true scope of the present invention should be defined by the appended claims and their equivalents.

What is claimed is:

1. A method for producing a carbon nanotube structure, the carbon nanotube structure consisting of carbon nanotubes as a constituent component, wherein the carbon nanotube structure has a fiber shape, a rod shape, or a spherical shape, which is produced by process comprising the steps of:
    preparing a carbon nanotube suspension by pulverizing and mixing carbon nanotubes in a hydrophilic solvent;
    freezing the carbon nanotube suspension by cooling using a coolant to form a frozen suspension by:
        (a)(i) injecting the carbon nanotube suspension into a capillary; and
        (a)(ii) cooling the carbon nanotube suspension injected into the capillary, thereby forming the fiber shape or rod shape; or
        (b)(i) spraying the suspension in droplets; and
        (b)(ii) freezing the sprayed droplets, thereby forming the spherical shape; and
    removing the hydrophilic solvent from the frozen suspension.

2. The method for producing the compressed carbon nanotube structure according to claim 1,
    wherein the phase separation occurs between the solvent and the carbon nanotubes during cooling of the suspension,
    wherein the solvent is frozen from the outer surface of the suspension in contact with the coolant to be crystallized, and
    wherein the carbon nanotubes are pushed to the center of the suspension in which crystallization is occurred relatively later than on the surface due to the crystal growth of the solvent, thereby the carbon nanotubes are densely concentrated therein.

3. The method for producing the carbon nanotube structure according to claim 1, the hydrophilic solvent has a freezing point of −40° C. or higher.

4. The method for producing the carbon nanotube structure according to claim 1, wherein the frozen solvent is removed by high temperature heating or freezing-drying.

5. The method for producing the carbon nanotube structure according to claim 1, wherein the content of the carbon nanotubes is 0.1 wt % to 20 wt % with respect to the total weight of the suspension.

6. The method for producing the carbon nanotube structure according to claim 1, wherein the decreasing rate of the diameter or length of the carbon nanotube structure with respect to the diameter or length of the frozen suspension is 20% or more, and the decreasing rate of the diameter or length is defined by the following Equation (2):

$$\text{Decreasing rate of the diameter or length (\%)} = \{1-[(\text{Diameter or length of the CNT structure})/(\text{Diameter or length of the frozen suspension})]\} \times 100. \quad [\text{Equation 2}]$$

7. The carbon nanotube structure according to claim 1, wherein the carbon nanotube structure has a bulk density of 20 to 1500 kg/m³, and the bulk density of the carbon nanotube structure is defined by the following Equation (1):

$$\text{Bulk density of CNT structure (kg/m}^3) = (M_s \times C_{cnt})/V_{cnt} = [(V_s \times \rho_s) \times C_{cnt}]/V_{cnt} \quad [\text{Equation 1}]$$

wherein, $M_s$ is a total weight of a frozen suspension, $C_{cnt}$ is a weight fraction of the carbon nanotubes contained in the suspension, $V_{cnt}$ is a volume of the manufactured carbon nanotube structure, $V_s$ is a total volume of the frozen suspension, and $\rho_s$ is a density of the frozen suspension.

8. A method for producing a carbon nanotube structure, the carbon nanotube structure consisting of carbon nanotubes as a constituent component, wherein the carbon nanotube structure has a plate shape or a coin shape, which is produced by a process comprising the steps of:

preparing a carbon nanotube suspension by pulverizing and mixing carbon nanotubes in a hydrophilic solvent;

freezing the carbon nanotube suspension by cooling using a coolant to form a frozen suspension by:

placing the suspension in a container or a mold having a bottom part and an upper part; and freezing the suspension by bringing the bottom part of the container or mold into contact with the coolant while the top part is not in direct contact with the coolant, wherein crystals of the hydrophilic solvent grow from the lower part to the upper part of the container or mold and the carbon nanotubes become dense at the top of the container or mold; and removing the hydrophilic solvent from the frozen suspension.

* * * * *